United States Patent [19]

Thompson

[11] Patent Number: 4,889,019
[45] Date of Patent: Dec. 26, 1989

[54] DISPOSABLE UNIFORM WIRE STRIPPER

[76] Inventor: Steven C. Thompson, 402 Kent Dr., Eufaula, Ala. 36027

[21] Appl. No.: 162,029

[22] Filed: Feb. 19, 1988

[51] Int. Cl.⁴ .............................................. H02G 1/12
[52] U.S. Cl. ........................................ 81/9.4; 30/90.1
[58] Field of Search .................. 30/90.1; 81/9.4, 9.41, 81/9.42, 9.43, 9.44; 7/107, 132

[56] References Cited

U.S. PATENT DOCUMENTS

Re. 30,342  7/1980  Perrino ................................. 81/9.4
1,065,679   6/1913  Gregson et al. ................... 81/9.4 X
4,271,729   6/1981  Perrino et al. ....................... 30/90.1

Primary Examiner—Frank T. Yost
Assistant Examiner—Michael D. Folkerts

[57] ABSTRACT

A device for stripping insulation from the end of various types and sizes of electrical wire is disclosed. While the device has a wide range of uniform strip length adjustments, the cutting members are fixed to one diameter of cut. Each stripper is marked as to the wire type and wire gauge it strips and is of a hand-held hand-powered type.

1 Claim, 3 Drawing Sheets

DISPOSABLE UNIFORM WIRE STRIPPER

SUMMARY OF THE INVENTION

The invention relates to a wire stripper the invention is of a hand-held hand-powered type. This invention will remove a desired measure of insulation from various electrical wire types and sizes.

DESCRIPTION OF THE DRAWINGS

In the drawings which illustrates the assembly process of the part members in relationship to a completed wire stripping device designed to strip a repeated uniform measure of insulation from the end of various wire types and sizes of electrical wire referring now to the drawings.

DESCRIPTION OF THE INVENTION

Figure 1:
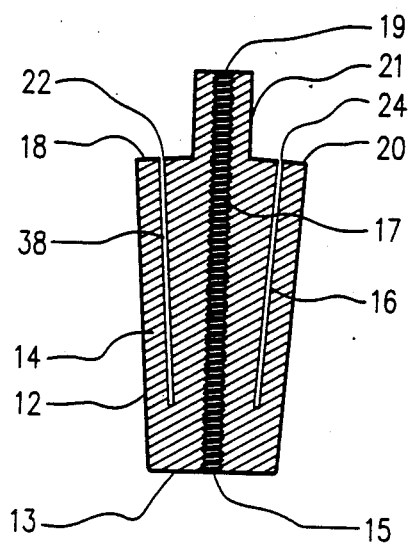
FIG. 1 is a front elevational view of the body showing the features of the body in relationship to the assembly of the invention.

Referring now to the drawings and particularly to the part members and their purpose in making up the embodiment of the invention generally indicated at 29. FIG. 1 showing the body of the invention indicated at 12, the bottom of the body at 13, the left spring slot at 14, and the right spring slot at 16, the round hole formed through the center of the body at 17, the left shoulder of the body at 18, and the right shoulder at 20, the entrance to the left spring slot at 22, and the entrance to the right spring slot at 24, the throat of the body is at 19, and the neck is at 21, the entrance for the strip length screw is at 15.

Figure 2:
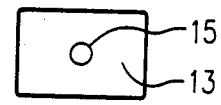
FIG. 2 is a bottom view of FIG. 1.

FIG. 2 is a bottom view of FIG. 1 showing the bottom surface of the body at 13 and the entrance for the strip length screw at 15.

Figure 3:
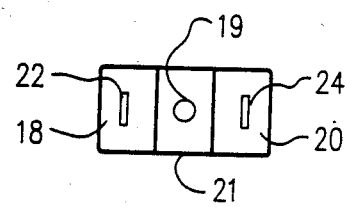
FIG. 3 is a top view of FIG. 1.

FIG. 3 is a top view of the body showing the left shoulder at 18 and the right shoulder at 20, the left spring entrance is shown at 22, and the right spring entrance is shown at 24, the throat of the body is at 19, and the neck is at 21.

Figure 4:
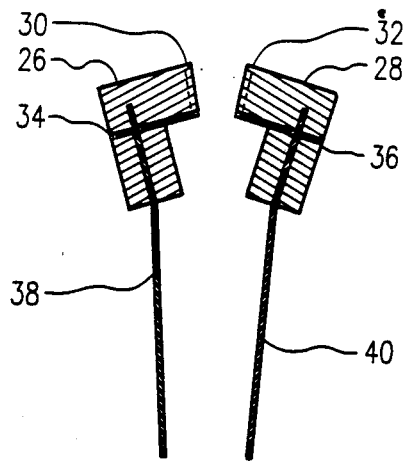
FIG. 4 is a front elevational view of the blade housings showing the part members thereof.

FIG. 4 is showing the left blade housing at 26, and the right blade housing at 28, the two wire guides are shown at 30 and 32, and the blades are at 34 and 36, the two straight flat springs mounted in the blade housing are shown at 38 and 40.

Figure 5:
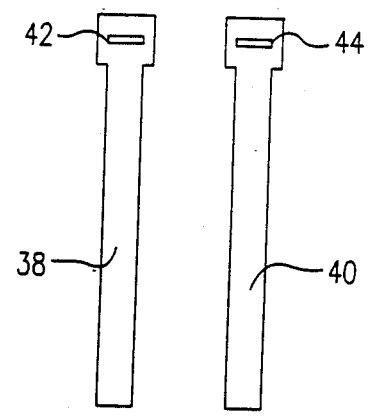
FIG. 5 is a side elevational view of the two straight flat springs.

FIG. 5 is an inside and outside view of the two straight flat springs 38 and 40, 42 and 44 is an inside and outside view of the springs slots through which the blades 34 and 36 intersect in the assembly thereof.

Figure 6:
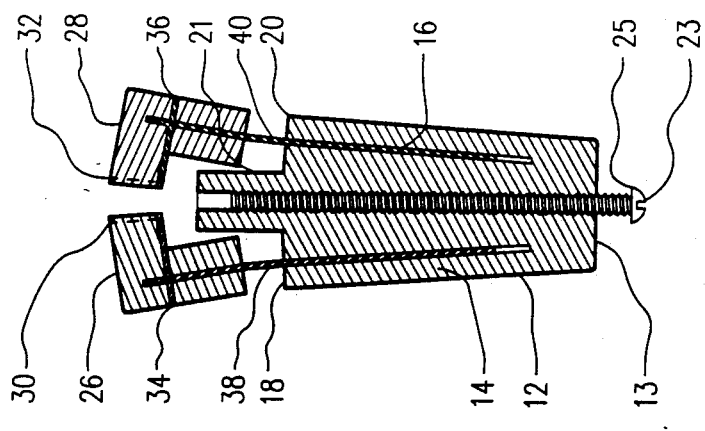
FIG. 6 is a front elevational view of the final assembly joining the part members to a completed wire stripping device.

FIG. 6 is a sectional assembly view showing the sections of the invention being joined together.

Figure 7:
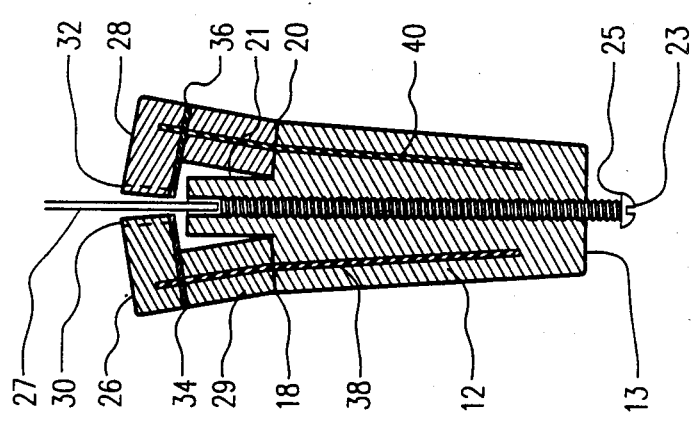
FIG. 7 is a front elevational view of the embodiment of the invention in the relaxed position.

FIG. 7 is showing the embodiment of the invention in the relaxed position prior to the stripping operation showing the strip length screw 23 set to a measure of strip from 13, the bottom of the body, to 25, the bottom of the strip length screw. The wire has been inserted in the throat and is making contact with the strip length screw 23.

Figure 8:
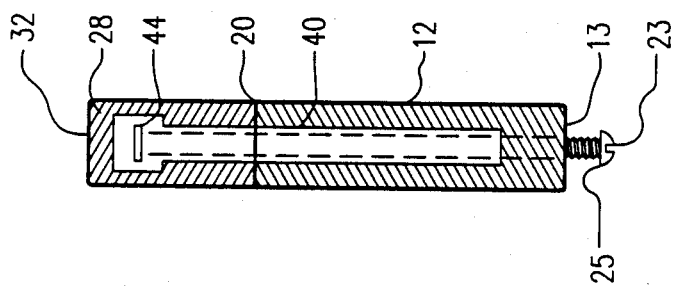
FIG. 8 is a cut away elevational view of the right straight flat spring in the relaxed position.

FIG. 8 is a cut away view of the right side of the stripper in the relaxed position showing the right wire guide 32 and the right blade housing 28, the right spring slot is shown at 44, the shoulder is shown at 20, and the right straight flat spring is shown at 40, the body is at 12, and the strip length screw 23 is set at zero strip length. The bottom of the body is at 13.

Figure 9:
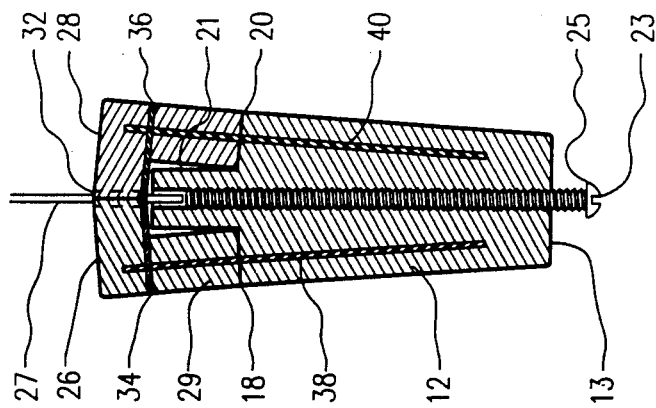
FIG. 9 is a front elevational view of the embodiment of the invention in the wire stripping position.

FIG. 9 is showing the wire stripper in the wire stripping position with the strip length screw 23 set to a measure of strip from 13 to 25, showing the body at 12, and the two straight flat springs at 38 and 40, the left and right shoulders at 18 and 20, the blades 34 and 36 penetrating the wire 27, and the wire guides 30 and 32 in the stripping operation as 26 and 28 are pressed together.

Figure 10:
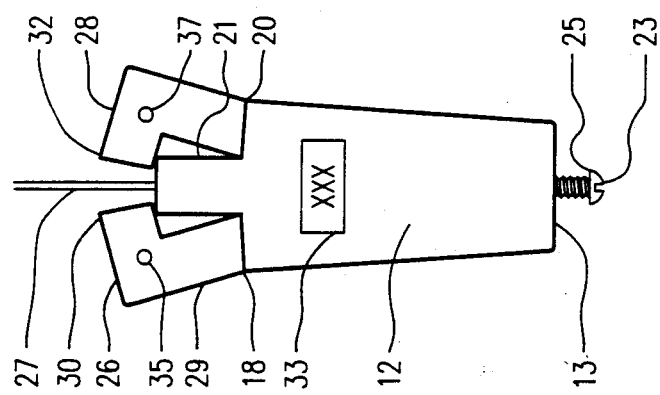
FIG. 10 is an outside elevational view of the invention showing the markings as to the wire type and wire gauge stripped by this wire stripping device.

FIG. 10 is an outside front view showing the markings as to the type wire at 33.

Figure 11:
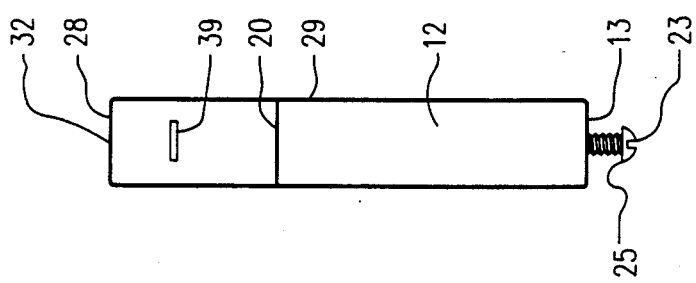
FIG. 11 is an outside elevational view of the right side of the wire stripping device in the relaxed position.

FIG. 11 is an outside view of the right side of the stripper embodiment showing the wire guide 32 at the face of the right blade housing, and the slot formed in the blade housing at 39, the right blade housing at 28, and the right shoulder at 20, and the strip length screw at 23, and the measure of strip at 13 and 25.

What is claimed:

1. A device for stripping insulation from electrical wire comprising an elongated body having an upper and a lower end, said body having a threaded bore extending longitudinally through the center thereof, an adjustable screw extending into said bore from the lower to the upper end of said body and having a length substantially equal to the length of said bore, said body having a wide first portion adjacent the lower end and a narrower second end adjacent the upper end, shoulders formed on opposing sides of said body where said first and second portions meet, said shoulders being substantially planar surfaces extending from the longitudinal sides of said second body portion to the longitudinal sides of said first body portion, a movable blade housing located on each side of said body, each blade housing being connected to one of said shoulders by a leaf spring, a lower portion of each blade housing having a lower recess such that each recess may receive half of said second body portion on either side of said bore, each blade housing further including a blade having an edge extending into said recess, an upper portion of each blade housing having a longitudinally extending slot along one side, such that when said second body portion is received within said blade housing recesses, said upper blade housing portions are brought into abutting contact and said slots form a wire receiving hole longitudinally aligned with said bore and said blade edges are positioned adjacent to said bore at the upper end of said body to perform a wire stripping operation.

* * * * *